(12) United States Patent
High

(10) Patent No.: US 6,745,525 B2
(45) Date of Patent: Jun. 8, 2004

(54) HOUSING FOR ELECTRICAL AND DATA WIRE MANAGEMENT

(75) Inventor: Bruce High, Lancashire (GB)

(73) Assignee: Technigroup Far East Pte Ltd. (SG)

( * ) Notice: Subject to any disclaimer, the term of this patent is extended or adjusted under 35 U.S.C. 154(b) by 163 days.

(21) Appl. No.: 09/931,133

(22) Filed: Aug. 16, 2001

(65) Prior Publication Data

US 2002/0050106 A1 May 2, 2002

(30) Foreign Application Priority Data

Aug. 18, 2000 (WO) ..................................... SG00/00119

(51) Int. Cl.$^7$ ................................................ E04C 2/52
(52) U.S. Cl. ....................... 52/220.7; 52/220.1; 52/36.1; 52/239
(58) Field of Search ................................ 52/36.1, 220.7, 52/239, 220.1, 220.2, 220.3, 220.4, 220.5, 220.8

(56) References Cited

U.S. PATENT DOCUMENTS

| | | | | |
|---|---|---|---|---|
| 4,391,073 A | * | 7/1983 | Mollenkopf et al. ........... 52/241 |
| 4,593,505 A | * | 6/1986 | Russell ....................... 52/220.7 |
| 4,596,098 A | | 6/1986 | Finkbeiner et al. ............ 52/220 |
| 4,601,137 A | * | 7/1986 | Bates ............................. 52/63 |
| 4,627,469 A | * | 12/1986 | Buard .......................... 138/92 |
| 4,831,759 A | * | 5/1989 | Hosey .......................... 40/564 |
| 5,003,740 A | * | 4/1991 | Dull et al. ..................... 52/239 |
| 5,025,603 A | * | 6/1991 | Johnson ..................... 52/220.7 |
| 5,056,577 A | | 10/1991 | DeLong et al. .............. 160/135 |
| 5,058,347 A | | 10/1991 | Schuelke et al. ............. 52/339 |
| 5,065,556 A | | 11/1991 | DeLong et al. ............... 52/221 |
| 5,081,808 A | * | 1/1992 | Bastian et al. ............. 52/220.7 |
| 5,357,055 A | * | 10/1994 | Sireci ........................... 174/48 |
| 5,455,515 A | * | 10/1995 | Saijo et al. .................. 324/538 |
| 5,456,617 A | * | 10/1995 | Chishima et al. ............ 439/513 |
| 5,487,246 A | * | 1/1996 | Hodges et al. .............. 52/220.7 |
| 5,592,794 A | * | 1/1997 | Tundaun ..................... 52/220.7 |
| 5,598,670 A | * | 2/1997 | Humphrey et al. ......... 52/220.8 |
| 5,606,919 A | | 3/1997 | Fox et al. ...................... 108/50 |
| 5,715,633 A | * | 2/1998 | Raz et al. ................... 52/220.7 |
| 5,724,779 A | * | 3/1998 | Chang ......................... 52/239 |
| 5,831,211 A | * | 11/1998 | Gartung et al. ............... 174/48 |
| 5,939,674 A | * | 8/1999 | Jibe et al. ...................... 174/59 |
| 5,964,618 A | * | 10/1999 | McCarthy ................... 439/574 |
| 6,007,366 A | * | 12/1999 | Torii et al. ................... 439/397 |
| 6,076,204 A | | 6/2000 | Mullick ......................... 4/556 |
| 6,086,410 A | * | 7/2000 | Lin ............................. 439/425 |
| 6,125,600 A | * | 10/2000 | Bastian ...................... 52/220.7 |
| 6,145,253 A | * | 11/2000 | Gallant et al. ............... 52/36.1 |
| 6,146,190 A | * | 11/2000 | Fuerst et al. ................ 439/496 |
| 6,250,949 B1 | * | 6/2001 | Lin ............................. 439/418 |
| 6,384,327 B1 | * | 5/2002 | Bellanger .................... 174/48 |
| 6,393,782 B1 | * | 5/2002 | Berridge et al. .............. 52/239 |
| 6,408,579 B1 | * | 6/2002 | Anderson et al. .......... 52/220.7 |
| 6,481,168 B1 | * | 11/2002 | Hodges et al. ............. 52/220.7 |

FOREIGN PATENT DOCUMENTS

| | | |
|---|---|---|
| GB | 2 289 903 | 12/1995 |
| WO | 89/11572 | 11/1989 |

* cited by examiner

Primary Examiner—Jeanette Chapman
(74) Attorney, Agent, or Firm—Nields & Lemack

(57) ABSTRACT

A housing 5 with a cable access aperture 9 for electrical and data wiring, is slidably fitted into a panel rail 1 with one or more apertures for use in a office panel system, the cable access aperture 9 of the housing then aligned with an aperture in the panel slide, said housing 5 being held in its position by a fastening means 11, the aligned apertures allowing the passage of electrical and data wires.

7 Claims, 7 Drawing Sheets

HOUSING FOR ELECTRICAL AND DATA WIRE MANAGEMENT

FIELD OF INVENTION

The present invention relates to a housing for electrical and data wire management for use in an office panel system.

DESCRIPTION OF RELATED ART

Present day office furniture is modular in design. Such design makes use of modular pieces which are fitted to each other easily, allowing users to add or take out pieces to fit the office space and working requirements. Wires for connection of personal computers and other office equipment would then have to be laid to such equipment through or under the modular pieces.

There have been office panel systems with spaces for wires to be laid. However, such wires for office equipment are usually pulled through in an unorganized manner. This makes wire re-laying and re-wiring difficult.

OBJECT AND SUMMARY OF THE INVENTION

The present invention was made to solve the above problems.

Accordingly, a first object of the invention is to provide a housing for electrical and data wiring management slidably fitted into a panel rail with one or more apertures for use in an office panel system, the panel having a rail on each side, the housing comprising a linear groove on each side; an aperture for the passage of wires; a recess to receive a fastening means, a fastening means; a tightening means; and means to connect the housing to other parts of the office panel system, characterised in that the housing is slidably fitted into the groove of the panel rail, the aperture of the housing is then aligned with the aperture in the panel slide, said housing being locked into its position vis-a-vis with the slide rail of the office panel by the fastening means, to allow the passage of electrical wires.

A second object of the invention is to lock the housing in place when fitted into the panel slide with a fastening means comprising a fastener with two resilient shoulders, a tightening means comprising a tightening screw which is inserted into a hole at each end of the housing, wherein the fastener is inserted into the recess to receive the fastener, the shoulder of the fastener facing the panel rail is held in place when the tightening screw is screwed into the housing. Exerting pressure on each shoulder of the fastener causes the shoulder to push out against the panel rail, and the housing is then held in place.

A third object of the invention is to further allow the housing to be connected to other parts of the office panel system with a means to connect the housing to other parts of the office panel system with a means to connect the housing to other parts of the office panel system, comprising a cable harness rail holder, hinge, hollow tube holder, snap lock for hollow tube holder, snap lock for hinged cover and a hinged cover.

BRIEF DESCRIPTION OF THE DRAWINGS

Embodiments of the invention are hereinafter described, by way of example, with reference to the accompanying drawings.

DETAILED DESCRIPTION OF PREFERRED EMBODIMENT

Figure 1:
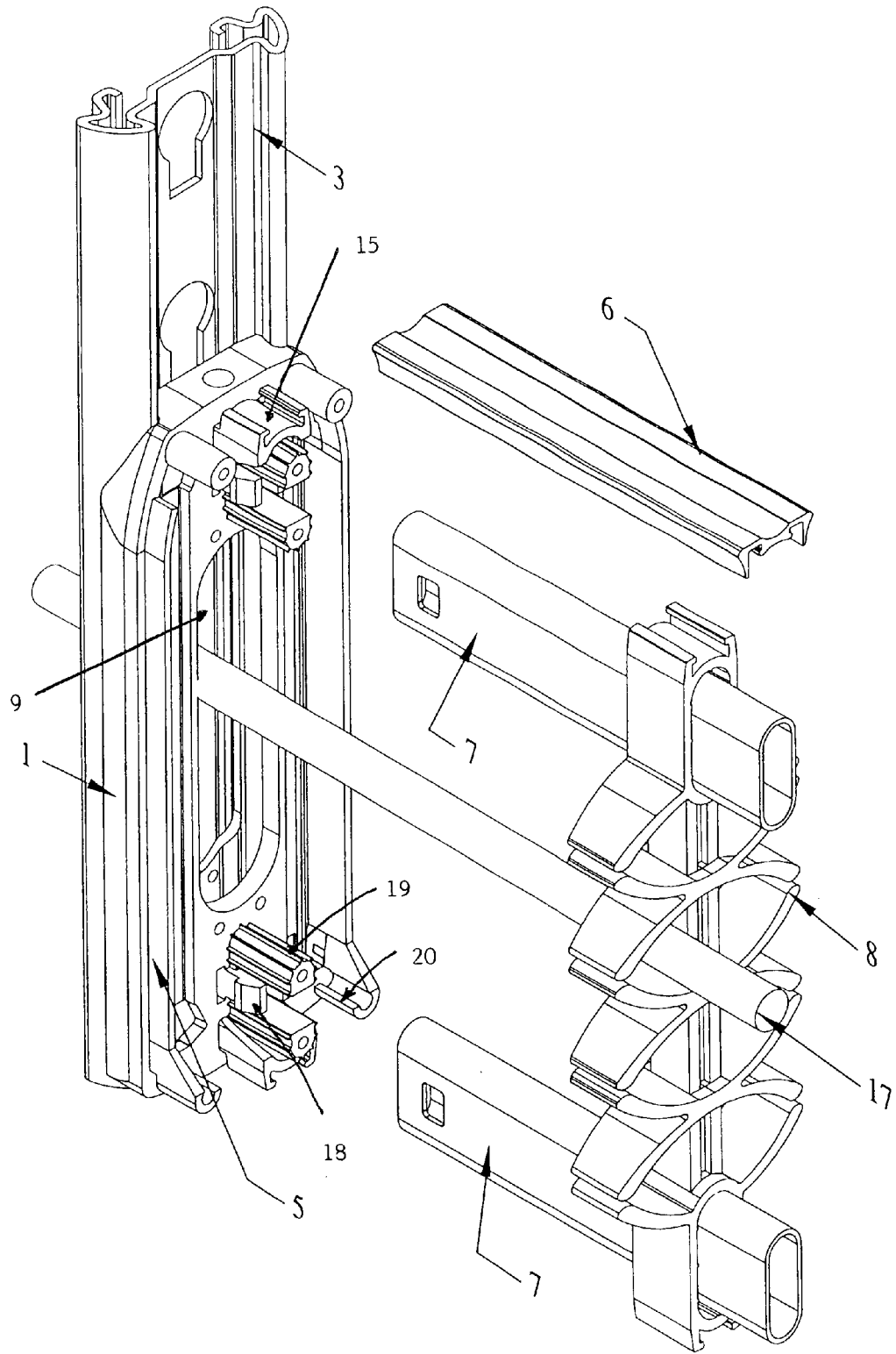
FIG. 1 is a perspective view of the housing in accordance with one embodiment of the present invention.

FIG. 1 is a perspective view of the housing 5 with other parts of the office system. The housing 5 has a cable access aperture 9 and a slide groove 10 on each side. The panel rail has one or more apertures and a linear slot 3 on each side. The housing is slid into the linear slot 3 of the panel rail. The aperture of the panel rail is then aligned with the cable access aperture 9 of the housing 5 and held in place with fastening and tightening means.

Figure 2:
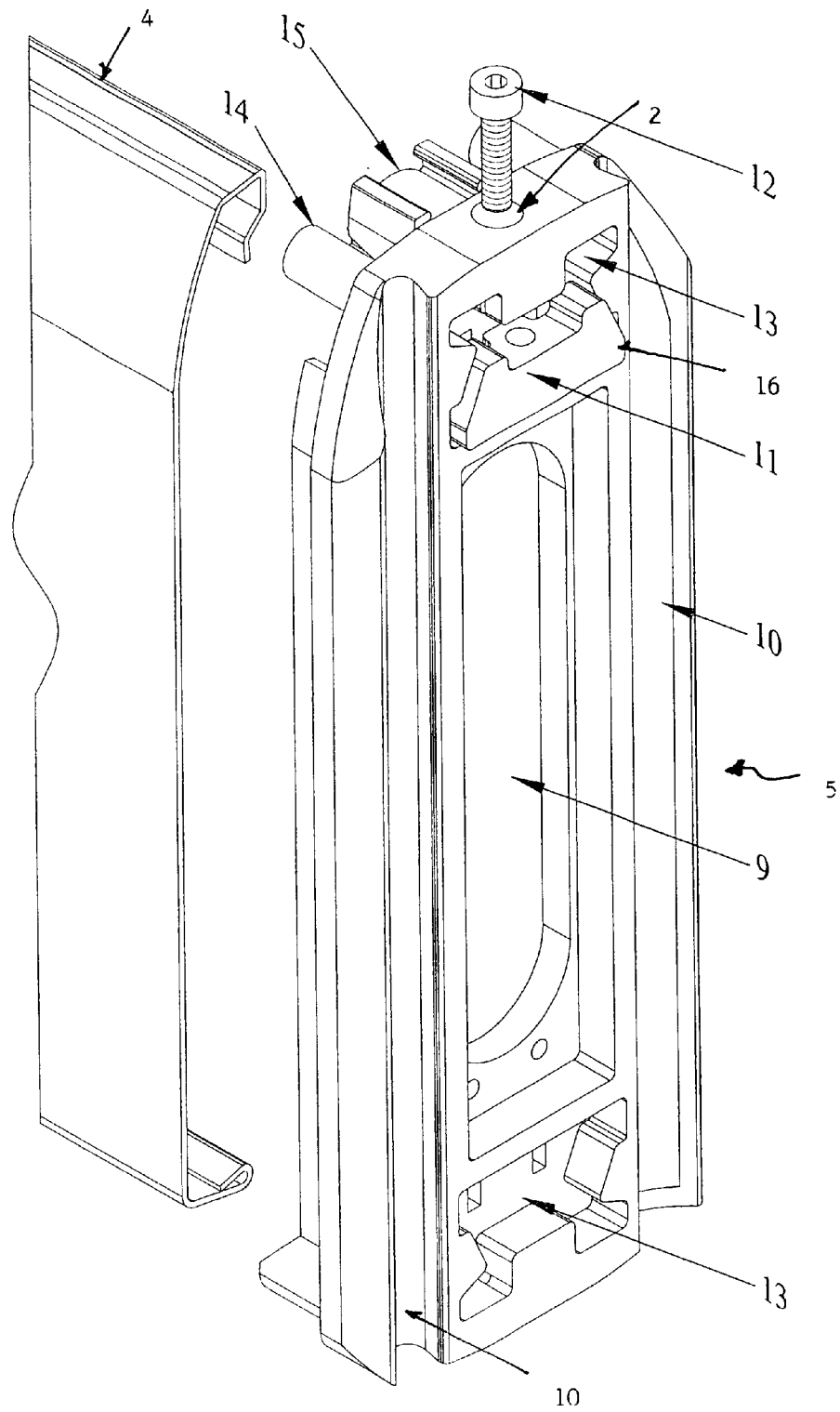
FIG. 2 is a perspective view of the housing viewed from the back with hinged cover detached.

The housing also has means to connect the housing to other parts of the office panel system, comprising a cable harness rail holder 15, a hinge 14, hollow tube holder 19, snap lock 18 for hollow tube 19, snap lock 20 for hinged cover 4, and a hinged cover 4 (FIG. 2). Cable harness rail 6 fits into cable harness rail holder 15 in the panel rail 1, and is fitted into cable harness 8, holding it in place. Cable harness 8 holds wire 17 as shown.

FIG. 2 is a perspective view of the housing 5 viewed from the back. A fastening means which is a fastener 11 with two resilient shoulders 16 is inserted into a recess 13 to receive the fastener 11 before the housing is to be slid into the panel rail.

The housing 5 has a slide groove 10 on each side, which slides fittingly into the linear slot 3 (FIG. 1) of the panel rail. After sliding into the linear slot of the panel rail, the cable access aperture 9 of the housing is aligned with the aperture or the panel rail. A tightening means in the form of a screw 12 is then inserted into a hole 2 located at the top of the housing and tightened, exerting pressure on the two resilient shoulders 16 of the fastener. The two resilient shoulders 16 then expand, pushing out against the panel rail, holding the housing in its place. A similar operation is repeated for the second hole located at the bottom of the housing.

The combined effect of the tightening means at the top and bottom of the housing against the panel rail holds the housing in place, with its cable access aperture 9 aligned with the aperture of the panel rail, thus allowing wires to be pulled through. Since the housing and the panel slide are connected to other pieces of a office panel system, electrical wires could be pulled through the cable access apertures and through other hollow spaces within the other pieces of the office panel system to allow connection to personal computers and other office equipment.

Figure 3:
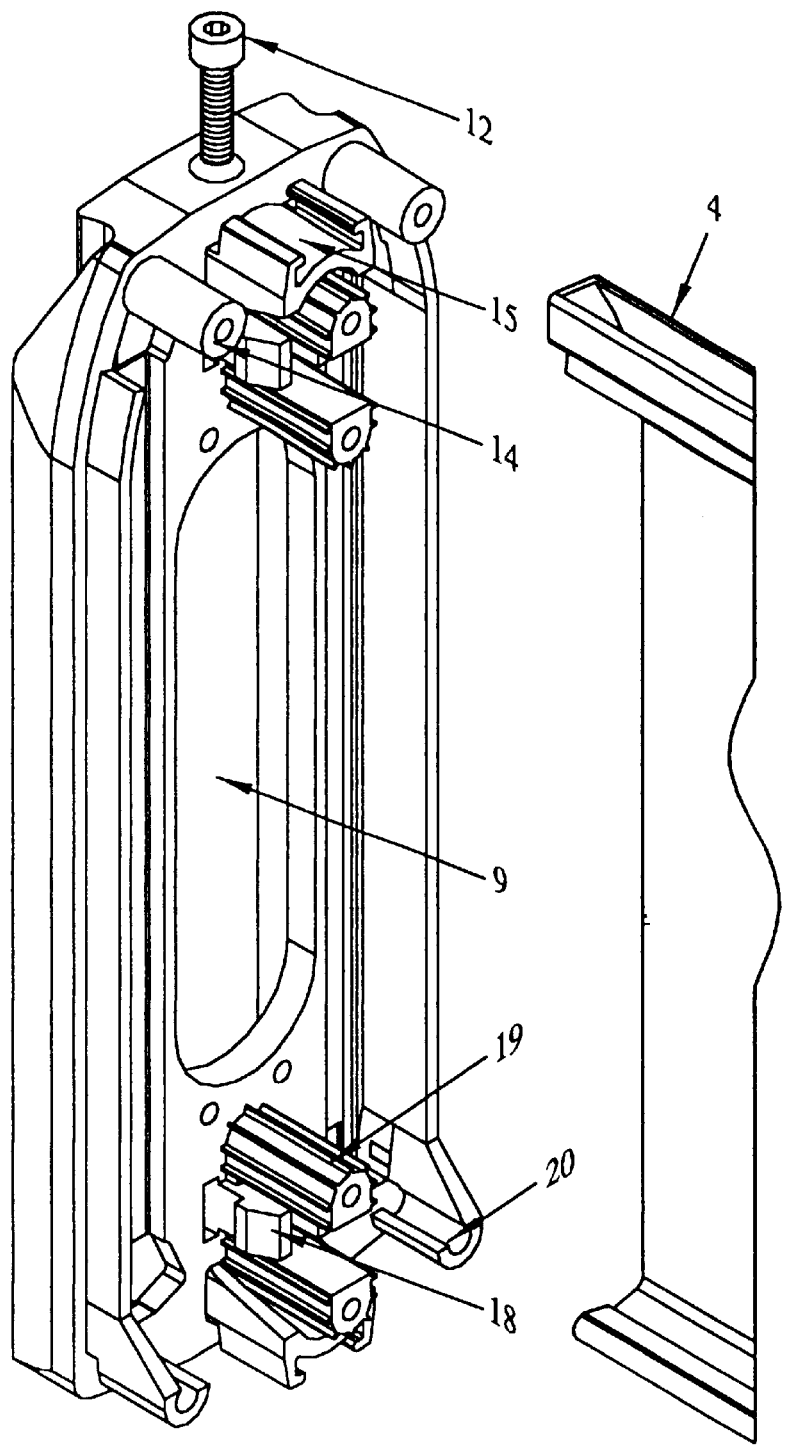
FIG. 3 is a perspective view of the housing viewed from the front.

FIG. 3 is a perspective view of the housing 5 viewed from the front. The front of the housing is connected to other parts of the office panel system such as a hollow tube 7 (FIG. 1) and cable harness rail holder 15 and also the hinged cover 4 and locked firmly in place by the hollow tube 7 and snap lock 20. This hinge cover 4 is held in place by the hinge 14. This will allow other pieces of the office panel system and the electrical wires to be laid through the hollow spaced of pieces of the office panel system and held in place securely.

Figure 4:
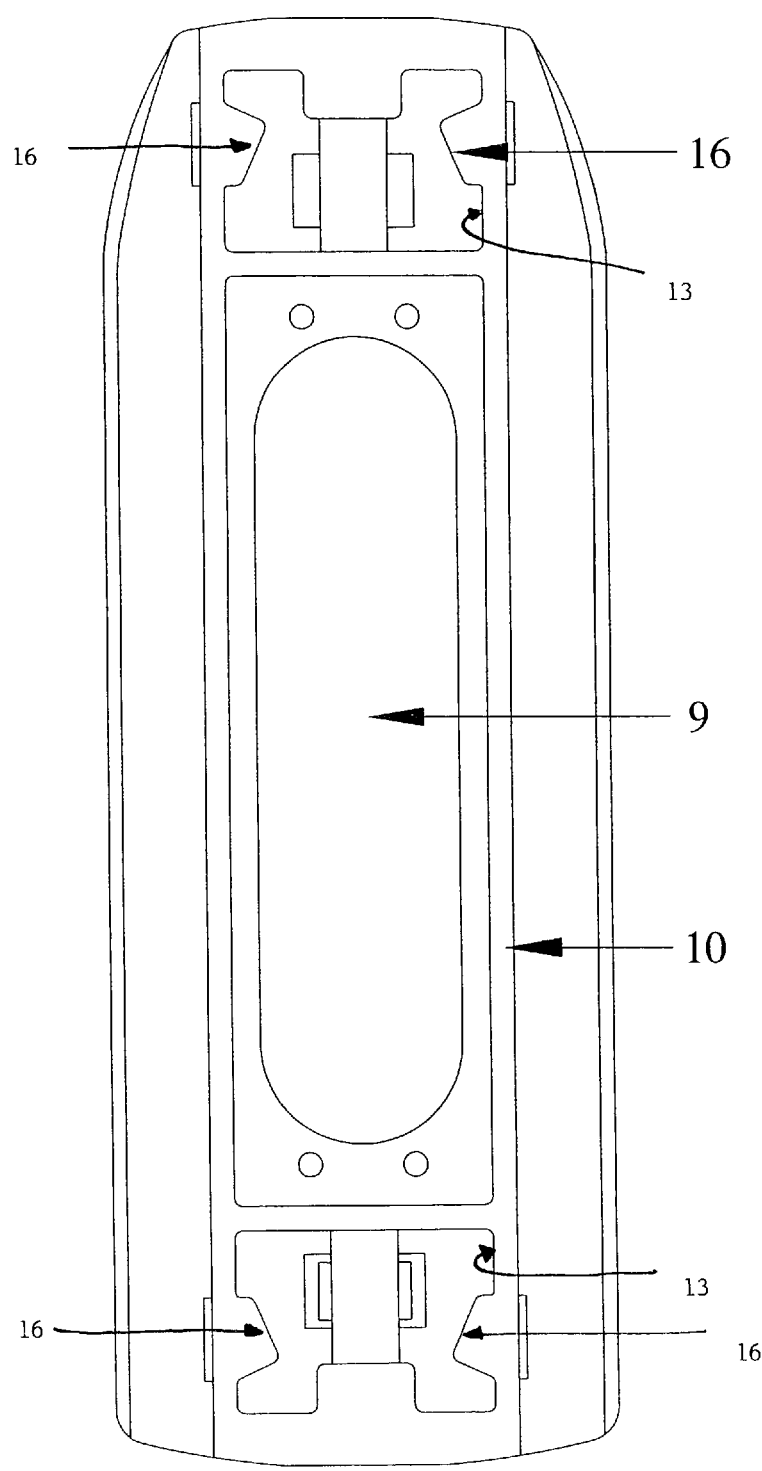
FIG. 4 is a cross section view of the housing viewed from the back.

FIG. 4 is a cross section of the housing viewed from the back without the fastening means nor tightening means. The top and bottom of the housing has a recess 13 to receive the fastener with its two resilient shoulders 16. The housing 5 has a slide groove 10 on each side, which slides into the linear slot 3 of the panel rail.

Figure 5:
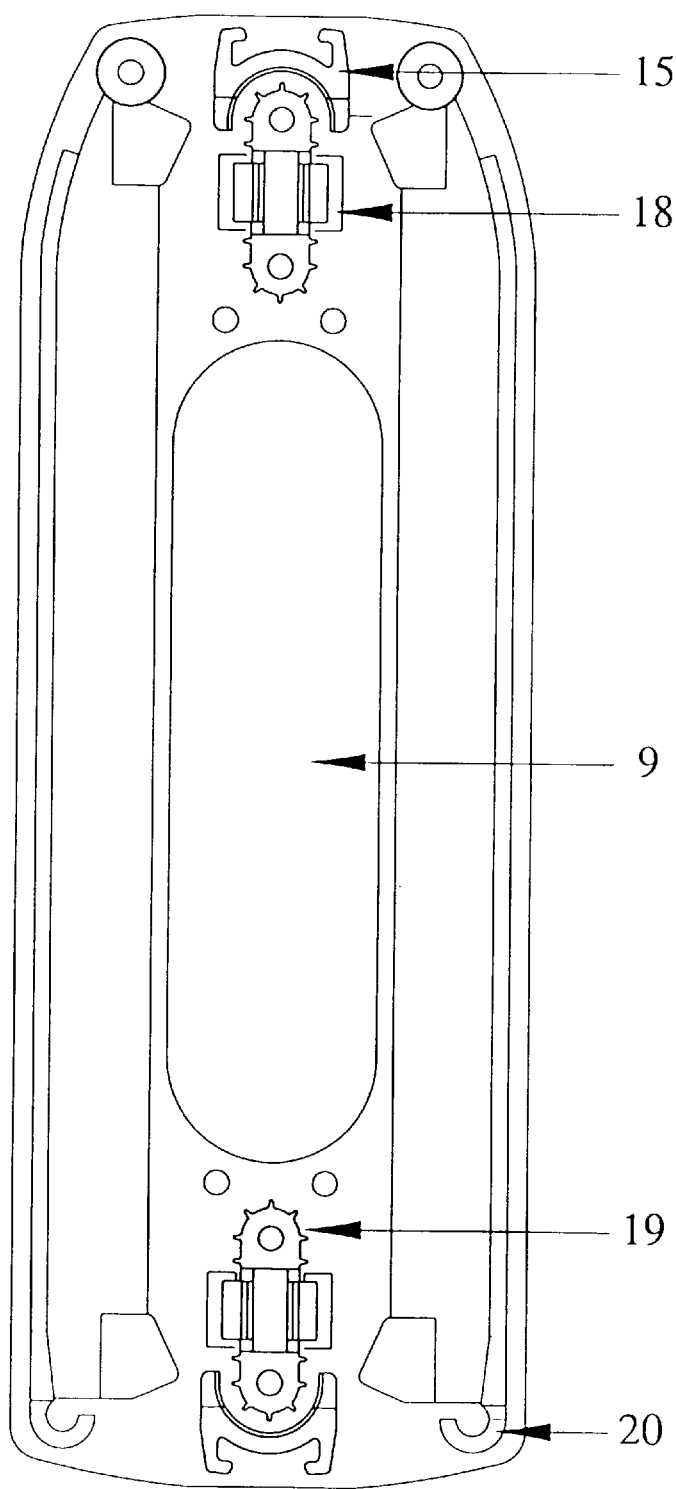
FIG. 5 is a cross section view of the housing viewed from the front.

FIG. 5 is a cross section view of the housing 5 from the front. The cable harness rail holder 15, hollow tube holder 19, snap lock 18 for hollow tube holder 19, snap lock 20 for snap lock cover 4, and a cable access aperture 9 are shown.

Figure 6:
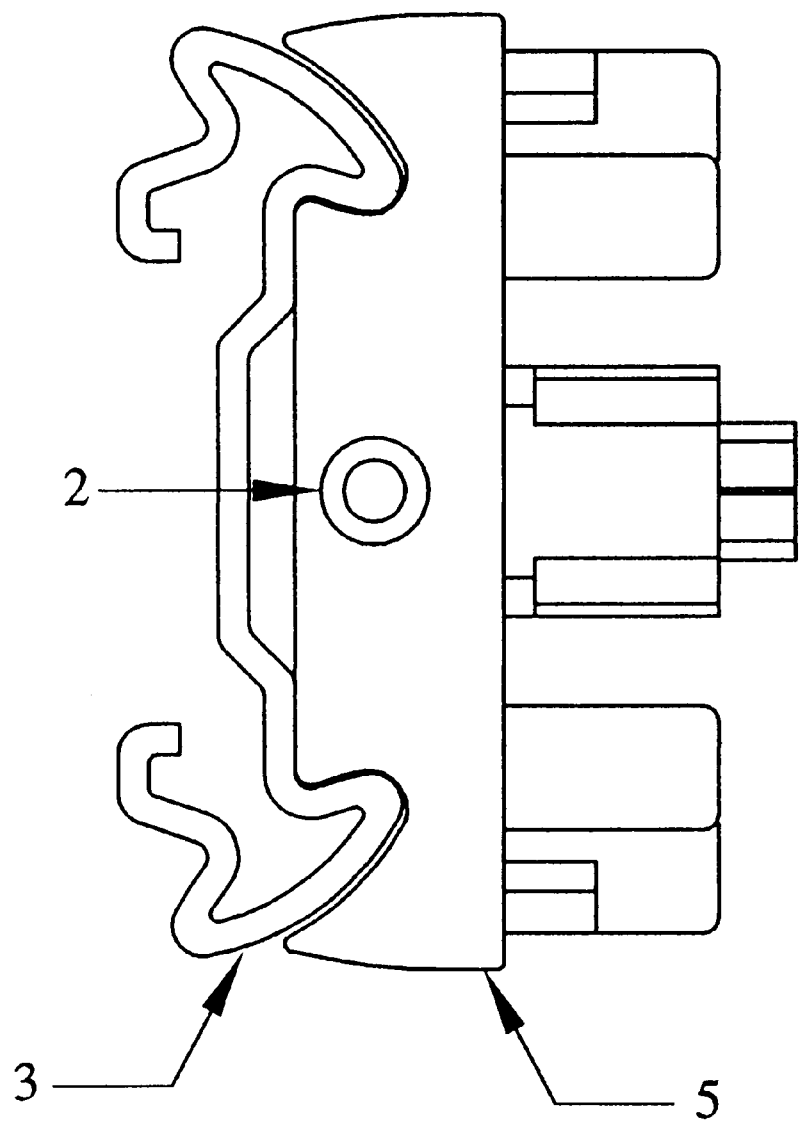
FIG. 6 is a cross section view of the housing viewed from the top.
Figure 7:
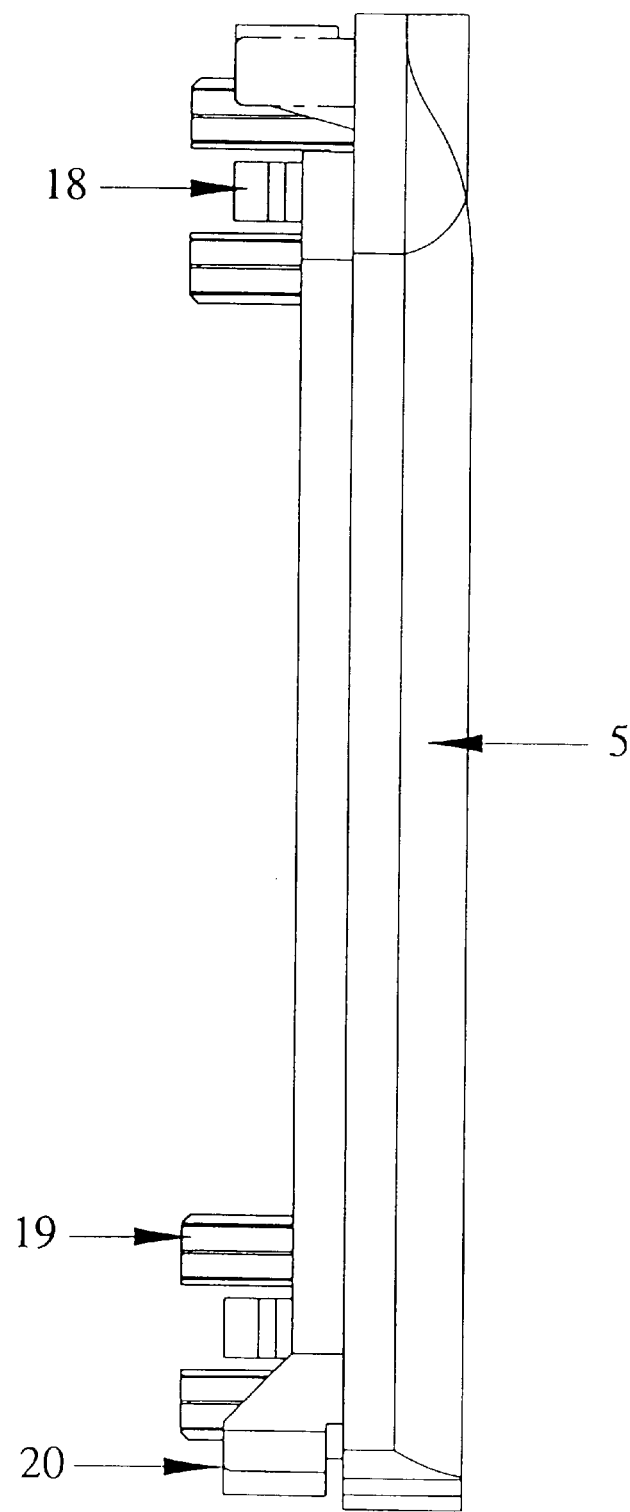
FIG. 7 is a cross section view of the housing viewed from one side.

FIG. 6 is a cross section view of the housing from the top. A recess hole 2 for the tightening screw 12 allows the tightening screw to be inserted into the housing through the recess hole. A similar hole to allow a second screw to be inserted into the housing is located at the bottom of the housing. The tightening screw 12 is only tightened onto the fastener when the cable access aperture of the housing and panel rail are aligned. The tightening action of the front portion of the tightening screw 12 exerts pressure on the shoulder 16 of the fastener. As the shoulder 16 of the fastener is resilient, the pressure of the screw on the fastener forces the shoulder 16 to push out against the front of the panel rail. It should be noted that panel rail and housing are always in a vertical position and unless held in place, the aperture of the panel rail and the aperture of the housing would tend to be out of alignment causing the wires to be damaged or out of place. However, the combined force of each shoulder of the fastener 16 exerted on the panel rail is sufficient to hold the housing 5 in its place.

One advantage of this housing is to allow flexible and systematic laying of wires within a modular panel office system.

Another advantage is this housing allows easier maintenance of wires since the wires are all held in place neatly in an organized manner.

It will be understood that the housing described herein is a preferred embodiment and should not be construed as limiting in its scope of working.

What is claimed is:

1. A housing for electrical and data wiring management slidably fitted into a panel rail having one or more apertures for use in an office panel system, the panel having a rail on each side, each rail having a linear slot, the housing comprising:
   a linear groove on each side;
   an aperture for the passage of wires;
   a recess to receive a fastening means;
   a fastening means;
   a tightening means;
   wherein the housing is slidably fitted into said linear slot of the panel rail the aperture of the housing thereby aligning with the aperture in the panel, said housing being held in position by the fastening means, to allow the passage of electrical wires through said aperture of said housing and said aperture of said panel.

2. A housing as claimed in claim 1 wherein the fastening means comprise of a fastener with two resilient shoulders.

3. A housing as claimed in claim 1 wherein said housing further comprises opposite ends, each having a hole therein, and wherein said the tightening means comprise a tightening screw which is inserted into each said hole at each said end of the housing.

4. A housing as claimed in claim 1, wherein said fastener has a pair of shoulders, and wherein said fastener is positioned in said recess, said shoulder of the fastener being held in position when the tightening screw is screwed into the housing, thereby exerting pressure on each shoulder of the fastener causing each shoulder to push out against the panel rail and thereby hold the housing in place.

5. A housing as claimed in claim 7, wherein the means to connect the housing to said panel other than with said panel rail comprise a cable harness rail, hinge cover, hollow tube and snap lock cover.

6. A housing as claimed in claim 1, wherein said housing is molded out of plastics.

7. A housing as claimed in claim 1, further comprising means for connecting said housing to said panel other than with said panel rail.

* * * * *